US010819961B2

(12) United States Patent
Tanaka (10) Patent No.: US 10,819,961 B2
(45) Date of Patent: Oct. 27, 2020

(54) LIGHT SOURCE APPARATUS FOR USE IN PROJECTION THREE-DIMENSIONAL DISPLAY APPARATUS, WITH DYNAMIC DIFFUSION PLATE

(71) Applicant: Panasonic Intellectual Property Management Co., Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/448,494

(22) Filed: Jun. 21, 2019

(65) Prior Publication Data
US 2019/0394429 A1 Dec. 26, 2019

(30) Foreign Application Priority Data

Jun. 25, 2018 (JP) ................................ 2018-119640

(51) Int. Cl.
*H04N 9/31* (2006.01)
*H04N 13/363* (2018.01)
*G03B 21/20* (2006.01)

(52) U.S. Cl.
CPC ....... *H04N 9/3102* (2013.01); *G03B 21/2033* (2013.01); *H04N 9/3164* (2013.01); *H04N 9/3167* (2013.01); *H04N 13/363* (2018.05)

(58) Field of Classification Search
CPC .. H04N 9/3167; H04N 9/3164; H04N 9/3102; H04N 13/363; G03B 21/2033
(Continued)

(56) References Cited

U.S. PATENT DOCUMENTS

2004/0032736 A1* 2/2004 Huang .................. G03B 21/14
362/294
2004/0263500 A1 12/2004 Sakata
(Continued)

FOREIGN PATENT DOCUMENTS

JP 2004-325478 11/2004
JP 2005-173625 6/2005
(Continued)

OTHER PUBLICATIONS

Michael Perkins et al., "Lasers, Lamps, or Phosphors—Choices for the Future of Digital Cinema", SID Symposium Digest of Technical Papers, vol. 48, Issue 1, Book 1: Session 36: Projection: Solid State Illumination Invited Paper, pp. 513-516, Jun. 2, 2017.

*Primary Examiner* — Jerry L Brooks
(74) *Attorney, Agent, or Firm* — Wenderoth, Lind & Ponack, L.L.P.

(57) ABSTRACT

A light source apparatus includes a plurality of laser light sources configured to emit color light rays having multiple wavelength bands. The light source apparatus further includes a plurality of dichroic mirrors configured to combine the color light rays and output combined color light rays; and a dynamic diffusion plate configured to diffuse incident light rays from the plurality of dichroic mirrors so as to remove speckles specific to laser beams. One of the plurality of dichroic mirrors is configured to reflect blue light, and each of the plurality of laser light sources includes a blue laser light source. The blue laser light source is configured to generate a P-polarized short-wavelength-band laser beam, and an S-polarized long-wavelength-band laser beam having a wavelength longer than a wavelength of the P-polarized short-wavelength-band laser beam.

11 Claims, 8 Drawing Sheets

(58) Field of Classification Search
USPC .......................................................... 353/31
See application file for complete search history.

(56) References Cited

U.S. PATENT DOCUMENTS

| | | | |
|---|---|---|---|
| 2010/0066813 A1 | 3/2010 | Jorke | |
| 2011/0032483 A1* | 2/2011 | Hruska | G02B 27/286 |
| | | | 353/8 |
| 2012/0008098 A1* | 1/2012 | Akiyama | F21S 41/148 |
| | | | 362/19 |
| 2012/0242912 A1 | 9/2012 | Kitano | |
| 2013/0083081 A1 | 4/2013 | Silverstein | |
| 2014/0232992 A1* | 8/2014 | Egawa | G02B 27/48 |
| | | | 353/30 |
| 2014/0354956 A1 | 12/2014 | Yamada et al. | |
| 2017/0336645 A1 | 11/2017 | Richards | |

FOREIGN PATENT DOCUMENTS

| | | |
|---|---|---|
| JP | 2012-212129 | 11/2012 |
| JP | 2015-502558 | 1/2015 |
| JP | 2015-25941 | 2/2015 |
| JP | 5968925 | 8/2016 |
| WO | 2008/061511 | 5/2008 |
| WO | 2013/105546 | 7/2013 |

* cited by examiner

LIGHT SOURCE APPARATUS FOR USE IN PROJECTION THREE-DIMENSIONAL DISPLAY APPARATUS, WITH DYNAMIC DIFFUSION PLATE

BACKGROUND OF THE INVENTION

Field of the Invention

The present disclosure relates to a projection-type three-dimensional display apparatus that irradiates an image formed on an image forming element with illumination light, enlarges and projects the image on a screen by using a projection lens, and displays a three-dimensional image.

Description of Related Art

A plurality of light source apparatuses using a solid-state light source of a semiconductor laser or a light-emitting diode having a long lifespan as a light source of a projection-type three-dimensional display apparatus using an image forming element of a mirror-deflection-type digital micromirror device (hereinafter, referred to as a DMD) or a liquid crystal panel has been disclosed. Among these apparatuses, a wavelength-division three-dimensional display apparatus using the laser light source is disclosed (see Patent Document 1 and Non Patent Document 1). A projection-type three-dimensional display apparatus with high efficiency and wide color gamut is achieved by using a laser light source that emits light in a narrowband.

PRIOR ART DOCUMENTS

Patent Document
Patent Document 1: Japanese Patent No. JP5968925B

Non Patent Document

Non Patent Document 1: Michel Perkins et al., "Lasers, Lamps, or Phosphors—Choices for the Future of Digital Cinema," SID Symposium Digest of Technical Papers, Vol. 48, Issue 1, Book 1: Session 36: Projection: Solid State Illumination, 36-2: Invited Paper, pp. 513-516, Jun. 2, 2017

As the projection-type three-dimensional display apparatus using the laser light source of the prior art, a laser light source apparatus is provided separately from the projection-type three-dimensional display apparatus, and the light from the laser light source is connected to the projection-type three-dimensional display apparatus by using an optical fiber. Thus, the projection-type three-dimensional display apparatus of which an adjustment range of output brightness is wide can be achieved by controlling light output or temperature of the laser light source apparatus. In addition, since the projection-type three-dimensional display apparatus has a small size, the projection-type three-dimensional display apparatus has an advantage of being easy to be installed.

However, since the laser light source apparatus is provided separately from the projection-type three-dimensional display apparatus, there is a problem that the entire size of the projection-type three-dimensional display apparatus becomes large or an optical loss due to the connection using the optical fiber is large. Thus, it is necessary to achieve a light source apparatus with small size and high efficiency by using a plurality of color laser light sources such as blue, green and red and a projection-type three-dimensional display apparatus using the light source apparatus.

SUMMARY OF THE INVENTION

The present disclosure has been made in order to solve the problems, and an object of the present disclosure is to provide a light source apparatus with small size and high efficiency compared to the prior art by using a plurality of color laser light sources and a projection-type three-dimensional display apparatus using the light source apparatus.

According to one aspect of the present disclosure, there is provided a light source apparatus including a plurality of laser light sources that emits color light rays having multiple wavelength bands. The light source apparatus further includes a plurality of dichroic mirrors that combines the color light rays and outputs a combined color light rays; and a dynamic diffusion plate that diffuses incident light rays from the plurality of dichroic mirrors so as to remove speckles specific to laser beams. One of the dichroic mirrors is a dichroic mirror that reflects blue light, and each of the plurality of laser light sources includes a blue laser light source. The blue laser light source generates a P-polarized short-wavelength-band laser beam, and an S-polarized long-wavelength-band laser beam having a wavelength longer than a wavelength of the short-wavelength-band laser beam.

Accordingly, in accordance with the present disclosure, the light source apparatus includes laser light sources that emit light rays having multiple wavelength bands, dichroic mirrors that combine the light rays from the laser light sources, and a dynamic diffusion plate. Since the laser beams having the multiple wavelength bands are polarized light rays perpendicular to each other on a short wavelength side and a long wavelength side, the light source apparatus with wide color gamut, small size, and high efficiency can be achieved. Thus, it is possible to realize a projection-type three-dimensional display apparatus with wide color gamut, small size, and high efficiency.

EMBODIMENTS

Hereinafter, embodiments for implementing the present disclosure will be described with reference to the drawings. It should be noted that, in the following embodiments, the same components will be assigned the same reference signs.

First Embodiment

Figure 1:
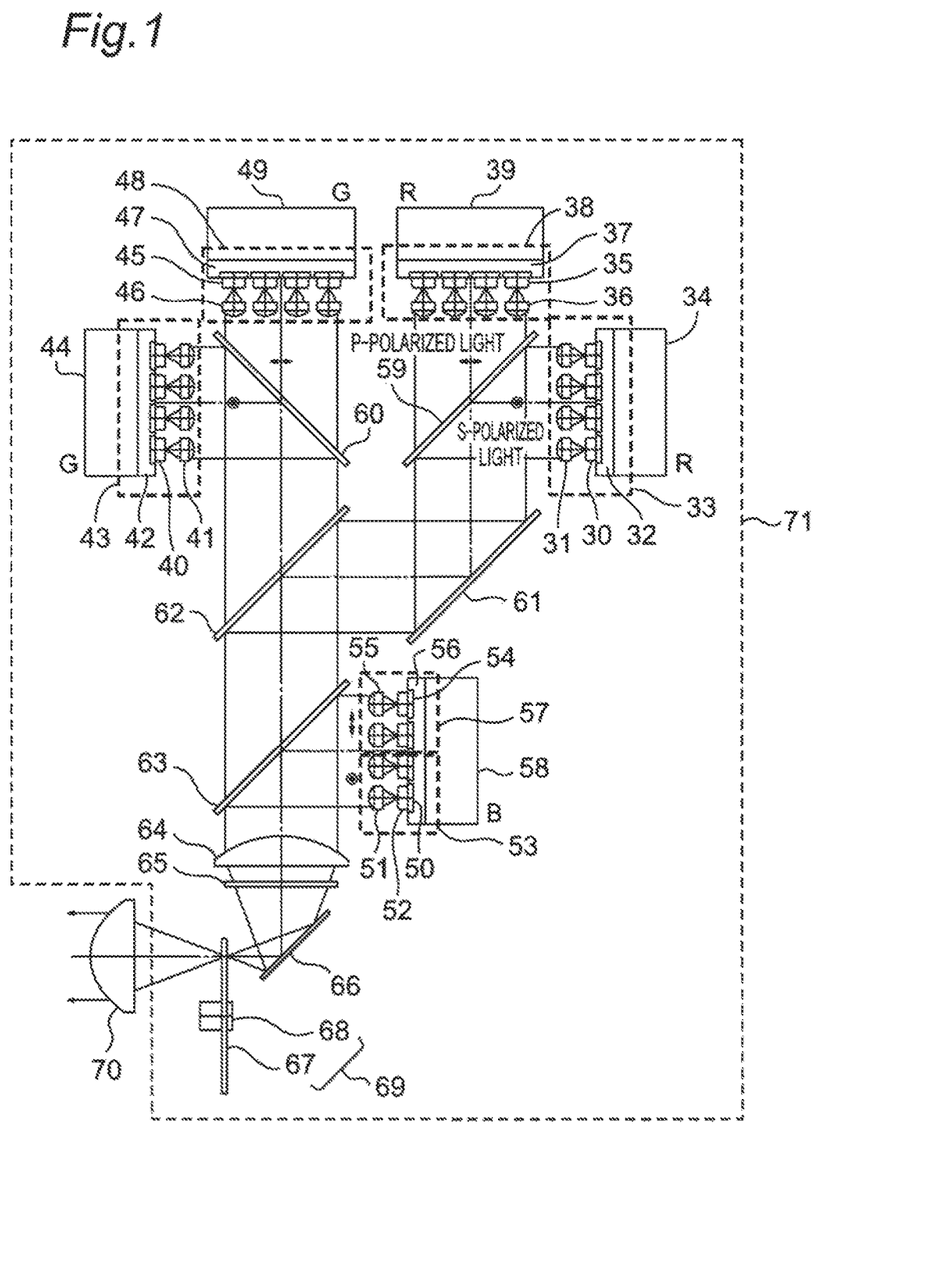
FIG. 1 is a block diagram illustrating a configuration example of a light source apparatus according to a first embodiment.

FIG. 1 is a block diagram illustrating a configuration example of a light source apparatus 71 according to a first embodiment of the present disclosure.

Referring to FIG. 1, the light source apparatus 71 according to the first embodiment includes a first red laser light source 33, a second red laser light source 38, a first green laser light source 43, a second green laser light source 48, a first blue laser light source 53, and a second blue laser light source 57. The light source apparatus 71 further includes heat sinks 34, 39, 44, 49, and 58, plate-type polarization beam splitters 59 and 60, a mirror 61, a red-reflecting dichroic mirror 62, a blue-reflecting dichroic mirror 63, a condenser lens 64, a diffusion plate 65, a mirror 66, and a rotary diffusion plate 69 as a dynamic diffusion plate, which is configured by a circular diffusion plate 67 and a motor 68 and removes a speckle specific to a laser beam. Further, a condenser lens 70 is provided outside the light source apparatus 71.

The first red laser light source 33 includes red semiconductor lasers 30, collimator lenses 31, and a heat radiation plate 32. The second red laser light source 38 includes red semiconductor lasers 35, collimator lenses 36, and a heat radiation plate 37. The first green laser light source 43 includes green semiconductor lasers 40, collimator lenses 41, and a heat radiation plate 42. The second green laser light source 48 includes green semiconductor lasers 45, collimator lenses 46, and a heat radiation plate 47. The first blue laser light source 53 includes blue semiconductor lasers 50, collimator lenses 51, and a heat radiation plate 52. The second blue laser light source 57 includes blue semiconductor lasers 54, collimator lenses 55, and a heat radiation plate 56.

It should be noted that, in the drawings, polarization directions of light rays emitted from the laser light sources 33, 38, 43, 48, 53, and 57 are illustrated.

The first red laser light source 33 is configured such that 24 (=6×4) red semiconductor lasers 30 arranged in a square shape and the collimator lenses 31 arranged in front of the red semiconductor lasers are arranged on the heat radiation plate 32 in a two-dimensional shape at a constant interval. In this case, each of the red semiconductor lasers 30 emits red light having a dominant wavelength of 660 nm, and emits S-polarized light. The second red laser light source 38 is configured such that 24 (=6×4) red semiconductor lasers 35 arranged in a square shape and the collimator lenses 36 arranged in front of the red semiconductor lasers are arranged on the heat radiation plate 37 in a two-dimensional shape at a constant interval. In this case, each of the red semiconductor lasers 35 emits red light having a dominant wavelength of 640 nm, and emits P-polarized light. For wavelength-division three-dimensional display, a wavelength difference between the dominant wavelength of the first red laser light source 33 and the dominant wavelength of the second red laser light source 38 is 20 nm. Generally, since the emission of the red semiconductor laser at 630 nm or less is under development, the red semiconductor laser 35 having a short wavelength emits the light at 640 nm.

The heat sinks 34 and 39 are provided in order to cool the red laser light sources 33 and 38. Output light rays emitted from the red semiconductor lasers 30 and 35 are concentrated and converted into parallel rays by the corresponding collimator lenses 31 and 36, respectively, and are then incident on the polarization beam splitter 59. The polarization beam splitter 59 reflects the S-polarized light rays from the red laser light source 33, and transmits the P-polarized light rays from the red laser light source 38. Polarized-combined red light rays are reflected from the mirror 61, and are incident on the red-reflecting dichroic mirror 62.

The first green laser light source 43 is configured such that 24 (=6×4) green semiconductor lasers 40 arranged in a square shape and the collimator lenses 41 arranged in front of the green semiconductor lasers are arranged on the heat radiation plate 42 in a two-dimensional shape at a constant interval. In this case, each of the green semiconductor lasers 40 emits green light having a dominant wavelength of 530 nm, and emits S-polarized light. The second green laser light source 48 is configured such that 24 (=6×4) green semiconductor lasers 45 arranged in a square shape and the collimator lenses 46 arranged in front of the green semiconductor lasers are arranged on the heat radiation plate 47 in a two-dimensional shape at a constant interval. In this case, each of the green semiconductor lasers 45 emits green light having a dominant wavelength of 510 nm, and emits P-polarized light. For wavelength-division three-dimensional display, a wavelength difference between the dominant wavelength of the first green laser light source 43 and the dominant wavelength of the second green laser light source 48 is 20 nm. Generally, since the emission of the green semiconductor laser at 530 nm or more is under development, the green semiconductor laser 40 having a long wavelength emits the light at 530 nm.

The heat sinks 44 and 49 are provided in order to cool the green laser light sources 43 and 48. Output light rays emitted from the green semiconductor lasers 40 and 45 are concentrated and converted into parallel rays by the corresponding collimator lenses 41 and 46, respectively, and are then incident on the polarization beam splitter 60. The polarization beam splitter 60 reflects the S-polarized light rays from the green laser light source 43, and transmits the P-polarized light rays from the green laser light source 48. Polarized-combined green light rays are incident on the red-reflecting dichroic mirror 62. The red-reflecting dichroic mirror 62 reflects the light rays of the red laser light sources 33 and 38, and transmits the light rays of the green laser light sources 43 and 48. The light rays from the red-reflecting dichroic mirror 62 are incident on the blue-reflecting dichroic mirror 63.

The first blue laser light source 53 is configured such that 8 (=4×2) blue semiconductor lasers 50 arranged in a square shape and the collimator lenses 51 arranged in front of the blue semiconductor lasers are arranged on the heat radiation plate 52 in a two-dimensional shape at a constant interval. In this case, each of the blue semiconductor lasers 50 emits blue light having a dominant wavelength of 465 nm, and emits S-polarized light. The second blue laser light source 57 is configured such that 8 (=4×2) blue semiconductor lasers 54 arranged in a square shape and the collimator lenses 55 arranged in front of the blue semiconductor lasers are arranged on the heat radiation plate 56 in a two-dimensional shape at a constant interval. The blue semiconductor laser 54 emits blue light having a dominant wavelength of 445 nm, and emits P-polarized light. For wavelength-division three-dimensional display, a wavelength difference between the dominant wavelength of the first blue laser light source 53 and the dominant wavelength of the second blue laser light source 57 is 20 nm. The heat sink 58 is provided in order to cool the blue laser light sources 53 and 57. Since the blue semiconductor lasers have higher luminous efficacy and lower light output required for desired white light chromaticity than the red and green semiconductor lasers, the number of blue semiconductor lasers 50 and 54 is about ⅓ of the number of red and green semiconductor lasers 30, 35, 40, and 45. Output light emitted from the blue semiconductor lasers 50 and 54 are concentrated and converted into parallel rays by the corresponding collimator lenses 51 and 55, respectively, and are then incident on the blue-reflecting dichroic mirror 63.

Figure 2:
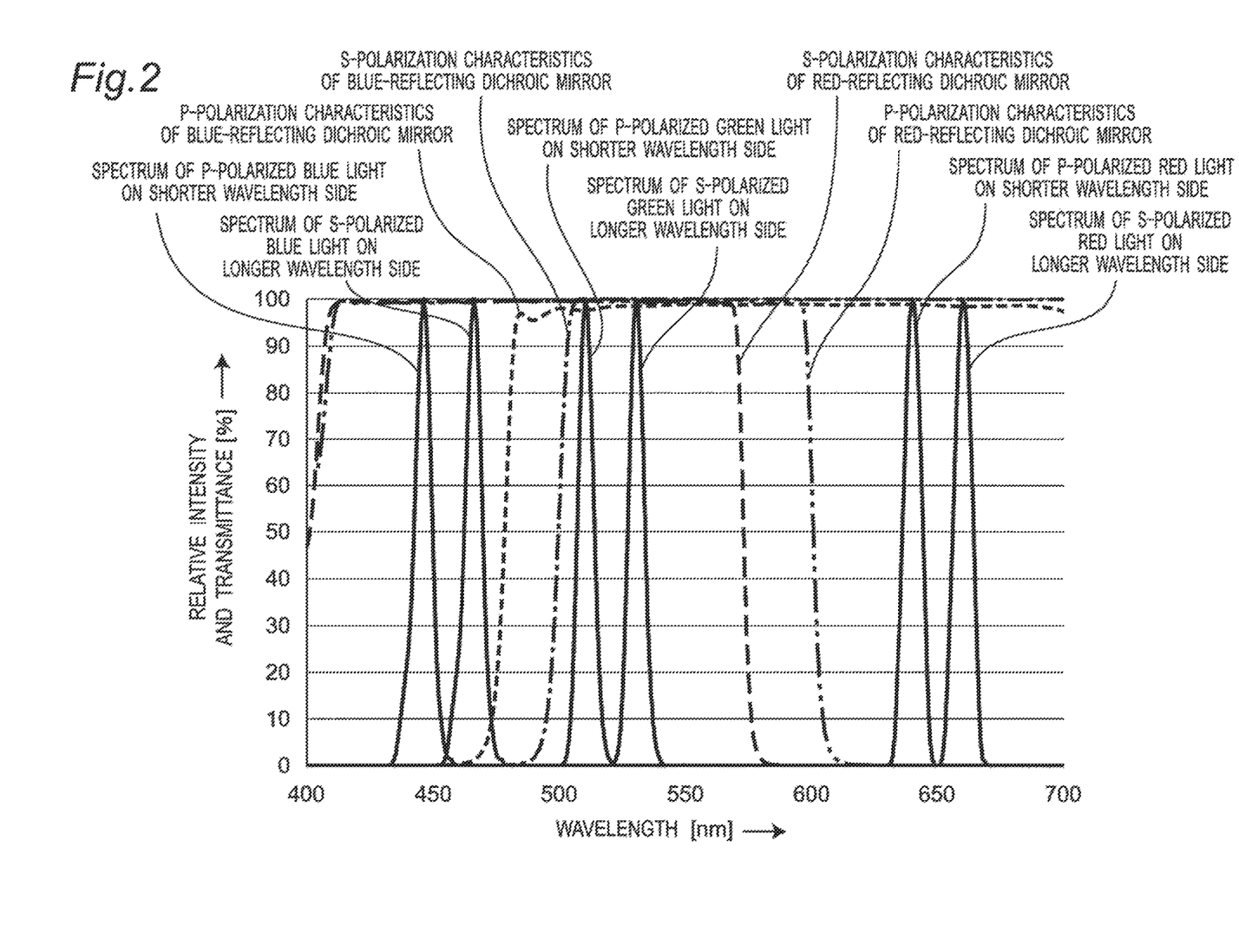
FIG. 2 is a spectrum diagram illustrating spectrum characteristics of laser beams and spectral transmittance characteristics of dichroic mirrors used in the light source apparatus of FIG. 1.

FIG. 2 is a spectrum diagram illustrating emission spectra of red, green, and blue laser beams and spectral characteristics of the dichroic mirrors.

Referring to FIG. 2, each emission spectrum represents relative intensity when peak intensity of each laser beam is 100%. The red, green, and blue laser beams are emitted in two wavelength bands, respectively. In each emission spectrum, the light at a short wavelength side is the P-polarized light, and the light on a long wavelength side is the S-polarized light. Transmittances of the P-polarized light and the S-polarized light of the red-reflecting dichroic mirror 62 and transmittances of the P-polarized light and the S-polarized light of the blue-reflecting dichroic mirror 63 are illustrated. Assuming that a wavelength in which the transmittance is 50% is a cut-off wavelength, a cut-off wavelength of the red-reflecting dichroic mirror 62 has characteristics of 573 nm for the S-polarized light and 600 nm for the P-polarized light. In addition, a cut-off wavelength of the blue-reflecting dichroic mirror 63 has characteristics of 500 nm for the S-polarized light and 478 nm for the P-polarized light.

Since the dominant wavelengths of the red laser beam are 640 nm (P-polarized light) and 660 nm (S-polarized light) and the cut-off wavelength for the P-polarized light and the cut-off wavelength for S-polarized light of the red-reflecting dichroic mirror 62 are 573 nm and 600 nm, respectively, the red laser beam is efficiently reflected. In addition, since the dominant wavelengths of the green laser beam are 510 nm (P-polarized light) and 530 nm (S-polarized light) and the cut-off wavelength for P-polarized light and the cut-off wavelength for S-polarized light of the red-reflecting dichroic mirror 62 are, 573 nm and 600 nm, respectively, the green laser beam is efficiently transmitted.

Since the dominant wavelengths of the blue laser beam are 445 nm (P-polarized light) and 465 nm (S-polarized light) and the cut-off wavelength for the P-polarized light and the cut-off wavelength for the S-polarized light of the blue-reflecting dichroic mirror 63 are 478 nm and 500 nm, respectively, the blue laser beam is efficiently reflected. In addition, the dominant wavelengths of the green laser beam are 510 nm (P-polarized light) and 530 nm (S-polarized light) and the cut-off wavelength for the P-polarized light and the cut-off wavelength for the S-polarized light of the blue-reflecting dichroic mirror 63 are 478 nm and 500 nm, respectively. Therefore, the green laser beam is efficiently transmitted. Further, the red laser beam is also efficiently reflected. For the red-reflecting dichroic mirror, since a difference between the dominant wavelength and the cut-off wavelength is large, even though the light on the short wavelength side of the red laser beam is the S-polarized light and the light on the long wavelength side is the P-polarized light, the red laser beam is efficiently transmitted compared to the prior art.

Referring to FIG. 1, the laser beams transmitted through and reflected from the blue-reflecting dichroic mirror 63 are incident on the condenser lens 64. A lens shape of the condenser lens 64 is determined such that the laser beams are concentrated in the vicinity of the rotary diffusion plate 69. The laser beams transmitted through the condenser lens 64 are diffused by the diffusion plate 65, are reflected from the mirror 66, and are incident on the rotary diffusion plate 69. The diffusion plate 65 has a diffusion surface formed by forming fine micro-lenses formed on a glass substrate in an array shape, and diffuses the incident light rays. Compared to a diffusion plate obtained through chemical processing for processing a fine uneven shape on a glass surface by using a solution such as hydrofluoric acid, it is possible to reduce a maximum diffusion angle and it is possible to reduce a diffusion loss by forming the micro-lens shape. A diffusion angle as a half-angle width, which is 50% of the maximum intensity of the diffused light is approximately 5 degrees, and is small. Thus, polarization characteristics are retained. Assuming that a diameter with which the light intensity is 13.5% of the peak intensity is defined as a spot diameter, the diffused light is superimposed on spot light having a spot diameter of 3 mm to 5 mm, and is incident in the vicinity of the rotary diffusion plate 69. The diffusion plate 65 diffuses light such that a diameter of spot light becomes a desired spot diameter.

The rotary diffusion plate 69 includes the circular diffusion plate 67 at which a diffusion layer is formed on the glass substrate in a circumferential shape and the motor 68 that rotates the circular diffusion plate 67 provided at a central portion thereof, and can perform rotation control of the circular diffusion plate 67. The rotary diffusion plate 69 can rotate at a high speed up to about 10,800 rpm. The chemical-processed diffusion plate is used in the diffusion, the diffusion angle is approximately 12 degrees, and the polarization characteristics are maintained. The diffusion surface is rotated, and thus, a random interference pattern on a screen, which is caused by the laser beam temporally and spatially varies at a high speed. Accordingly, it is possible to eliminate speckle noise. In addition, it is also possible to reduce a minute emission size of the laser light source and minute brightness unevenness caused by the number of times of the emission.

Light rays temporally multiplexed at a plurality of diffusion angles by the rotary diffusion plate 69 are concentrated on the condenser lens 70, and are converted into approximately parallel light rays. A shape of the condenser lens 70 is determined such that spot light rays in the vicinity of the rotary diffusion plate 69 become parallel light rays.

It should be noted that, in the first embodiment, the red-reflecting dichroic mirror 62 may be changed to the green-reflecting dichroic mirror and the arrangement of the green laser light sources and the red laser light sources may be changed.

In addition, although it has been described in the first embodiment that the diffusion plate of the micro-lens array is used as the diffusion plate 65, an inexpensive chemical-processed diffusion plate having slightly low light concentration efficiency may be used.

Further, it is described in the first embodiment that, 48, 48 and 16 semiconductor laser elements are arranged in the red laser light sources 33 and 38, the green laser light sources 43 and 48, and the blue laser light source 53 and 57, respectively. However, a plurality of semiconductor lasers may be further used in order to achieve high brightness.

As stated above, in accordance with the light source apparatus 71 according to the first embodiment, the red, green, and blue laser light sources that emit the multiple wavelength bands, the dichroic mirrors that combine the light rays from the laser light sources, and the rotary diffusion plate are provided. One of the dichroic mirrors is the dichroic mirror that reflects the blue light. Among the blue and green laser beams having the multiple wavelength bands, the laser beam having the short wavelength band is the P-polarized light, and the laser beam having the long wavelength band is the S-polarized light. Thus, as described in detail with reference to FIG. 2, it is possible to reduce a loss by preventing the polarization characteristics from being overlapped, and thus, it is possible to combine the red, green, and blue laser beams with a small size and high efficiency compared to the prior art.

Second Embodiment

Figure 3:
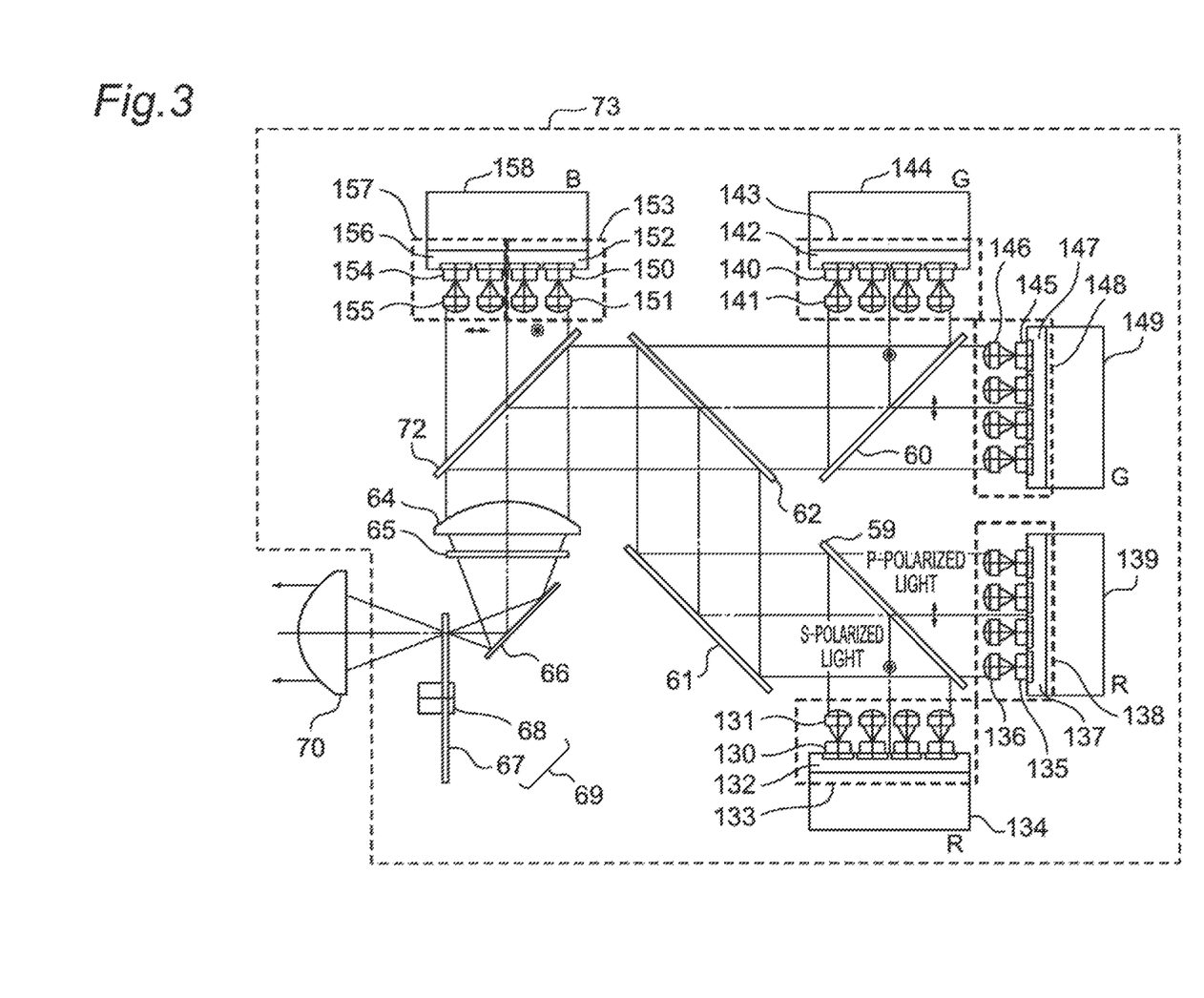
FIG. 3 is a block diagram illustrating a configuration example of a light source apparatus according to a second embodiment.

FIG. 3 is a block diagram illustrating a configuration example of a light source apparatus 73 according to a second embodiment.

Referring to FIG. 3, the light source apparatus 73 according to the second embodiment includes a first red laser light source 133, a second red laser light source 138, a first green laser light source 143, a second green laser light source 148, a first blue laser light source 153, and a second blue laser light source 157. The first red laser light source 133 includes red semiconductor lasers 130, collimator lenses 131, and a heat radiation plate 132. The second red laser light source 138 includes red semiconductor lasers 135, collimator lenses 136, and a heat radiation plate 137. The first green laser light source 143 includes green semiconductor lasers 140, collimator lenses 141, and a heat radiation plate 142. The second green laser light source 148 includes green semiconductor lasers 145, collimator lenses 146, and a heat radiation plate 147. The first blue laser light source 153 includes blue semiconductor lasers 150, collimator lenses 151, and a heat radiation plate 152. The second blue laser light source 157 includes blue semiconductor lasers 154, collimator lenses 155, and a heat radiation plate 156. The light source apparatus 73 further includes heat sinks 134, 139, 144, 149, and 158, plate-type polarization beam splitters 59 and 60, a mirror 61, a red-reflecting dichroic mirror 62, a condenser lens 64, a diffusion plate 65, a mirror 66, and a rotary diffusion plate 69, which is a dynamic diffusion plate including a circular diffusion plate 67 and a motor 68. A condenser lens 70 is provided outside the light source apparatus 73.

The light source apparatus 73 has the same configuration as the configuration of the light source apparatus 71 according to the first embodiment.

Differences between the light source apparatus of FIG. 3 according to the second embodiment and the light source apparatus of FIG. 1 are as follows.

(1) A blue-transmitting dichroic mirror 72 is disposed between the blue laser light source 157 and the condenser lens 64.

(2) In the red, green, and blue laser light sources 133, 138, 143, 148, 153, and 157 having multiple wavelength bands, emitted light having a short wavelength band is S-polarized light, and emitted light having a long wavelength band is P-polarized light.

It should be noted that, in the drawings, polarization directions of light rays emitted from the laser light sources 133, 138, 143, 148, 153, and 157 are illustrated.

The red semiconductor laser 130 emits red light having a dominant wavelength of 640 nm, and emits S-polarized light. The red semiconductor laser 135 emits red light having a dominant wavelength of 660 nm, and emits P-polarized light. The green semiconductor laser 140 emits green light having a dominant wavelength of 510 nm, and emits S-polarized light. The green semiconductor laser 145 emits green light having a dominant wavelength of 530 nm, and emits P-polarized light. The blue semiconductor laser 150 emits blue light having a dominant wavelength of 445 nm, and emits S-polarized light. The blue semiconductor laser 154 emits blue light having a dominant wavelength of 465 nm, and emits P-polarized light.

Red and green laser beams combined by the red-reflecting dichroic mirror 62 are incident on the blue-transmitting dichroic mirror 72. The light rays emitted from the blue semiconductor lasers 150 and 154 are concentrated and converted into parallel rays by the corresponding collimator lenses 151 and 155, and are then incident on the blue-transmitting dichroic mirror 72.

Figure 4:
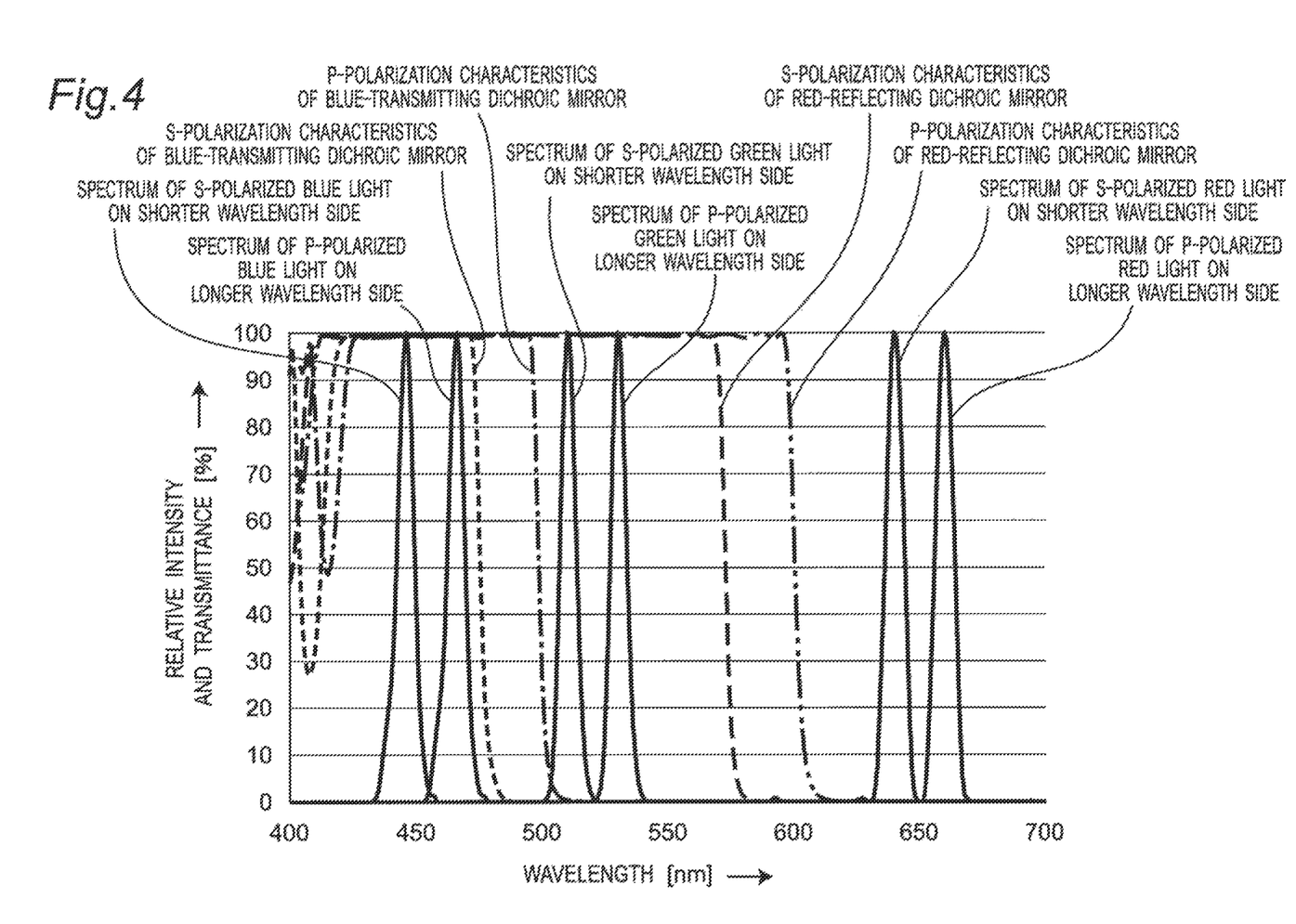
FIG. 4 is a spectrum diagram illustrating spectrum characteristics of laser beams and spectral transmittance characteristics of dichroic mirrors according to the second embodiment.

FIG. 4 is a spectrum diagram illustrating emission spectra of red, green, and blue laser beams and spectral characteristics of the dichroic mirrors.

Referring to FIG. 4, each emission spectrum represents relative intensity when peak intensity of each laser beam is 100%. The red, green, and blue laser beams are emitted in two wavelength bands, respectively. In each emission spectrum, the light on a short wavelength side is the S-polarized light, and the light on a long wavelength side is the P-polarized light. Transmittances of the P-polarized light and the S-polarized light of the red-reflecting dichroic mirror and transmittances of the P-polarized light and the S-polarized light of the blue-transmitting dichroic mirror 72 are illustrated. Assuming that a wavelength in which the transmittance is 50% is a cut-off wavelength, a cut-off wavelength of the red-reflecting dichroic mirror has characteristics of 573 nm for the S-polarized light and 600 nm for the P-polarized light. In addition, a cut-off wavelength of the blue-transmitting dichroic mirror 72 has characteristics of 498 nm for the P-polarized light and 475 nm for the S-polarized light. Since the dominant wavelengths of the blue laser beam are 445 nm (S-polarized light) and 465 nm (P-polarized light) and the cut-off wavelength for the S-polarized light and the cut-off wavelength for the P-polarized light of the blue-transmitting dichroic mirror 72 are 475 nm and 498 nm, respectively, the blue laser beam is efficiently transmitted. In addition, since the S-polarized light cut-off wavelength and the P-polarized light cut-off wavelength of the blue-transmitting dichroic mirror 72 are 475 nm and 498 nm for the dominant wavelengths 510 nm (S-polarized light) and 530 nm (P-polarized light) of the green laser beam, respectively, the green laser beam is efficiently reflected. Further, the red laser beam is also efficiently reflected. For the red-reflecting dichroic mirror, since a difference between the dominant wavelength and the cut-off wavelength is large, even though the light on the short wavelength side of the red laser beam is the P-polarized light and the light on the long wavelength side is the S-polarized light, the red laser beam is efficiently reflected compared to the prior art.

Referring to FIG. 3, the laser beams transmitted through and reflected from the blue-transmitting dichroic mirror 72 are incident on the condenser lens 64. The laser beams transmitted through the condenser lens 64 are diffused by the diffusion plate 65, are reflected from the mirror 66, and are concentrated in the vicinity of the rotary diffusion plate 69. A diffusion angle of the diffusion plate is approximately 5 degrees, and a spot diameter of concentrated light is 3 mm to 5 mm.

The rotary diffusion plate 69 includes the circular diffusion plate 67 at which a diffusion layer is formed on a glass substrate in the circumferential shape and the motor 68 provided in a central portion thereof, and can perform rotation control of the circular diffusion plate 67. A diffusion angle of the circular diffusion plate 67 is approximately 12 degrees. The diffusion surface of the rotary diffusion plate 69 is rotated, and thus, a random interference pattern on a screen, which is caused by the laser beam temporally and spatially varies at a high speed. Accordingly, it is possible to eliminate speckle noise. In addition, it is also possible to reduce a minute emission size of the laser light source and minute brightness unevenness caused by the number of times of the emission.

Light rays temporally multiplexed at a plurality of diffusion angles by the rotary diffusion plate 69 are concentrated on the condenser lens 70, and are converted into approximately parallel light rays.

In the second embodiment, the red-reflecting dichroic mirror 62 may be changed to the green-reflecting dichroic mirror and the arrangement of the green laser light sources and the red laser light sources may be changed.

In addition, it is described in the second embodiment that 48, 48 and 16 semiconductor laser elements are arranged in the red laser light sources 133 and 138, the green laser light sources 143 and 148, and the blue laser light sources 153 and 157, respectively. However, a plurality of semiconductor lasers may be further used in order to achieve high brightness.

As stated above, in accordance with the light source apparatus 73 according to the second embodiment, the red, green, and blue laser light sources that emit the multiple wavelength bands, the dichroic mirrors that combine the light rays from the laser light sources, and the rotary diffusion plate are provided. One of the dichroic mirrors is the dichroic mirror that transmits the blue light. Among the blue and green laser beams having the multiple wavelength bands, the laser beam having the short wavelength band is the P-polarized light, and the laser beam having the long wavelength band is the S-polarized light. Thus, as described in detail with reference to FIG. 4, it is possible to reduce a loss by preventing the polarization characteristics from being overlapped, and thus, it is possible to combine the red, green, and blue laser beams with a small size and high efficiency compared to the prior art.

Third Embodiment

Figure 5:
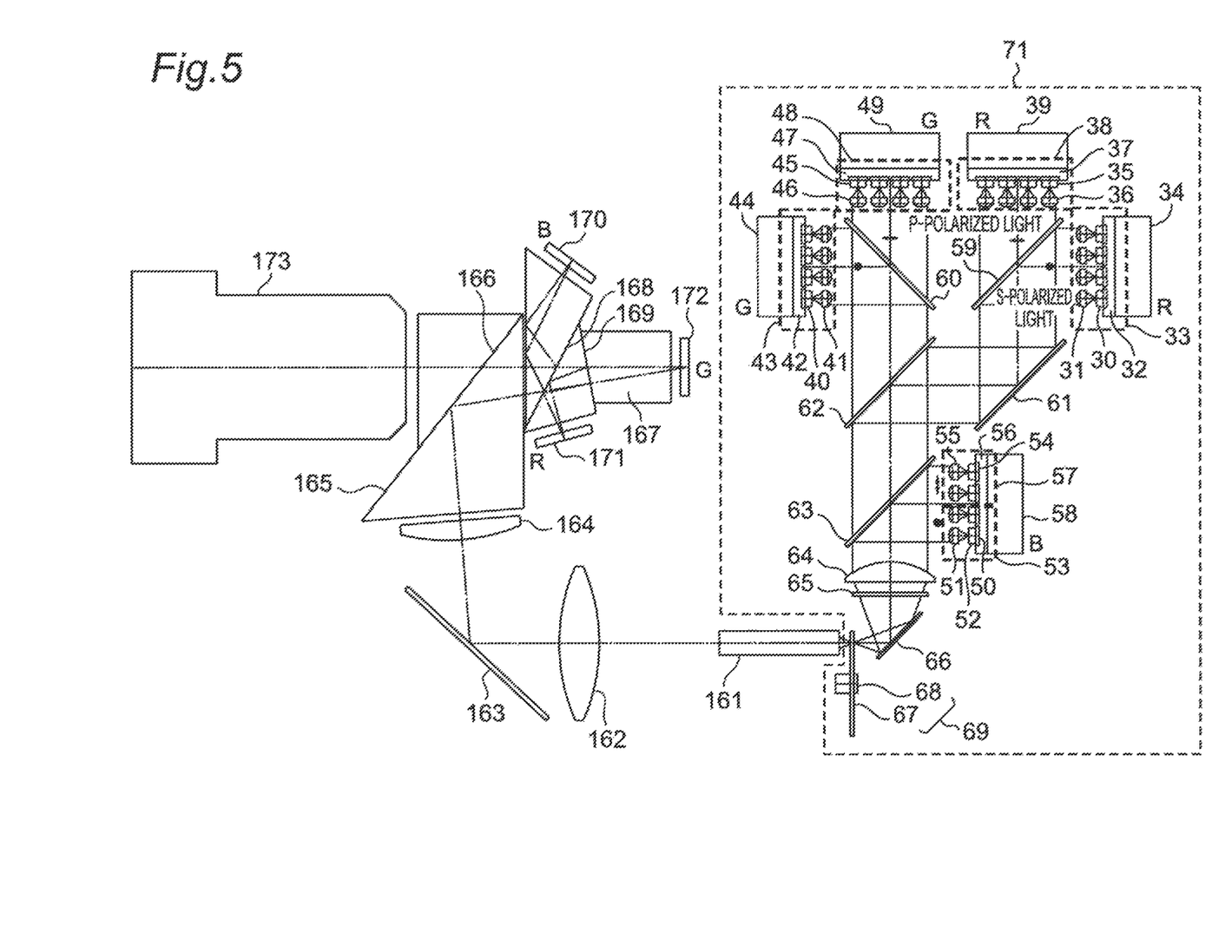
FIG. 5 is a block diagram illustrating a configuration example of a projection-type three-dimensional display apparatus according to a third embodiment of the present invention.

FIG. 5 is a projection-type three-dimensional display apparatus according to a third embodiment. The projection-type three-dimensional display apparatus according to the third embodiment has the following features.

(1) Three DMDs 170, 171, and 172 are used as image forming means.

(2) The light source apparatus 71 of FIG. 1 is used.

Referring to FIG. 5, the light rays emitted from the light source apparatus 71 are concentrated on a rod 161. The incident light rays on the rod 161 are reflected within the rod 161 by multiple times, and thus, a light intensity distribution thereof is uniformized. The light rays are emitted from the rod. The emitted light rays from the rod 161 are concentrated by a relay lens 162, and are reflected from a reflection mirror 163. The reflected light rays are transmitted through a field lens 164, and are incident on a total reflection prism 165. The total reflection prism 165 includes two prisms, and a thin air layer 166 is formed on a proximity surface between the prisms. The air layer 166 totally reflects incident light rays at an angle of a critical angle or more. The light rays from the field lens 164 are reflected from a total reflection surface of the total reflection prism 165, and are incident on a color prism 167.

The color prism 167 includes three prisms, and a blue-reflecting dichroic mirror 168 and a red-reflecting dichroic mirror 169 are formed on the proximity surface between the prisms. The light rays incident on the color prism are separated into the blue, red, and green light by the blue-reflecting dichroic mirror 168 and the red-reflecting dichroic mirror 169 of the color prism 167, and are incident on the DMDs 170, 171, and 172. The DMDs 170, 171, and 172 deflect micro-mirrors according to a video signal for a right eye and a video signal for a left eye of time-division three-dimensional display, and reflect light rays incident on a projection lens 173 and light rays traveling out of an effective region of the projection lens 173. The intensities of the red, green, and blue laser beams having two wavelength bands are modulated such that the light on the short wavelength side and the light on the long wavelength side correspond to the video signal for the right eye and the video signal for the left eye of the three-dimensional display, respectively. Since the laser light sources can be driven at a high speed, the laser light source can be driven according to the video signals for the three-dimensional display.

The light rays reflected from the DMDs 170, 171, and 172 are transmitted through the color prism 167 again. The separated blue, red, and green light rays are combined while the light rays are transmitted through the color prism 167, and are incident on the total reflection prism 165. Since the light rays incident on the total reflection prism 165 are incident on the air layer 166 at the critical angle or less, the light rays are transmitted, and incident on the projection lens 173. In so doing, image light rays formed by the DMDs 170, 171, and 172 are enlarged and projected on a screen (not illustrated). A three-dimensional image can be viewed through glasses that transmit only the light for the right eye of the image light rays for the right eye and the left eye enlarged and projected on the screen or only the light for the left eye.

Compared to the prior art, the light source apparatus 71 (FIG. 1) of FIG. 5 emits white light rays with a small size and high efficiency by using the red, green, and blue laser light sources having the multiple wavelength bands. Thus, it is possible to realize a projection-type three-dimensional display apparatus with a small size and wide color gamut. Since the DMDs 171, 172, and 173 are used as the image forming means, the projection-type three-dimensional display apparatus with high light resistance and high heat resistance can be achieved compared to the imaging forming means using liquid crystals. Further, since three DMDs 171, 172, and 173 are used, it is possible to obtain a bright high-definition projection image with favorable color reproduction compared to the prior art.

As stated above, in accordance with the projection-type three-dimensional display apparatus according to the third embodiment, the light source apparatus 71 includes the red, green, and blue laser light sources, the dichroic mirrors that combine the light rays of the laser light sources, and the rotary diffusion plate. Among the laser beams having the multiple wavelength bands, the light on the short wavelength side is the P-polarized light, and the light on the long wavelength side is the S-polarized light. These polarized light rays are perpendicular to each other. Thus, the projection-type three-dimensional display apparatus a small size and high efficiency can be achieved compared to the prior art.

Fourth Embodiment

Figure 6:
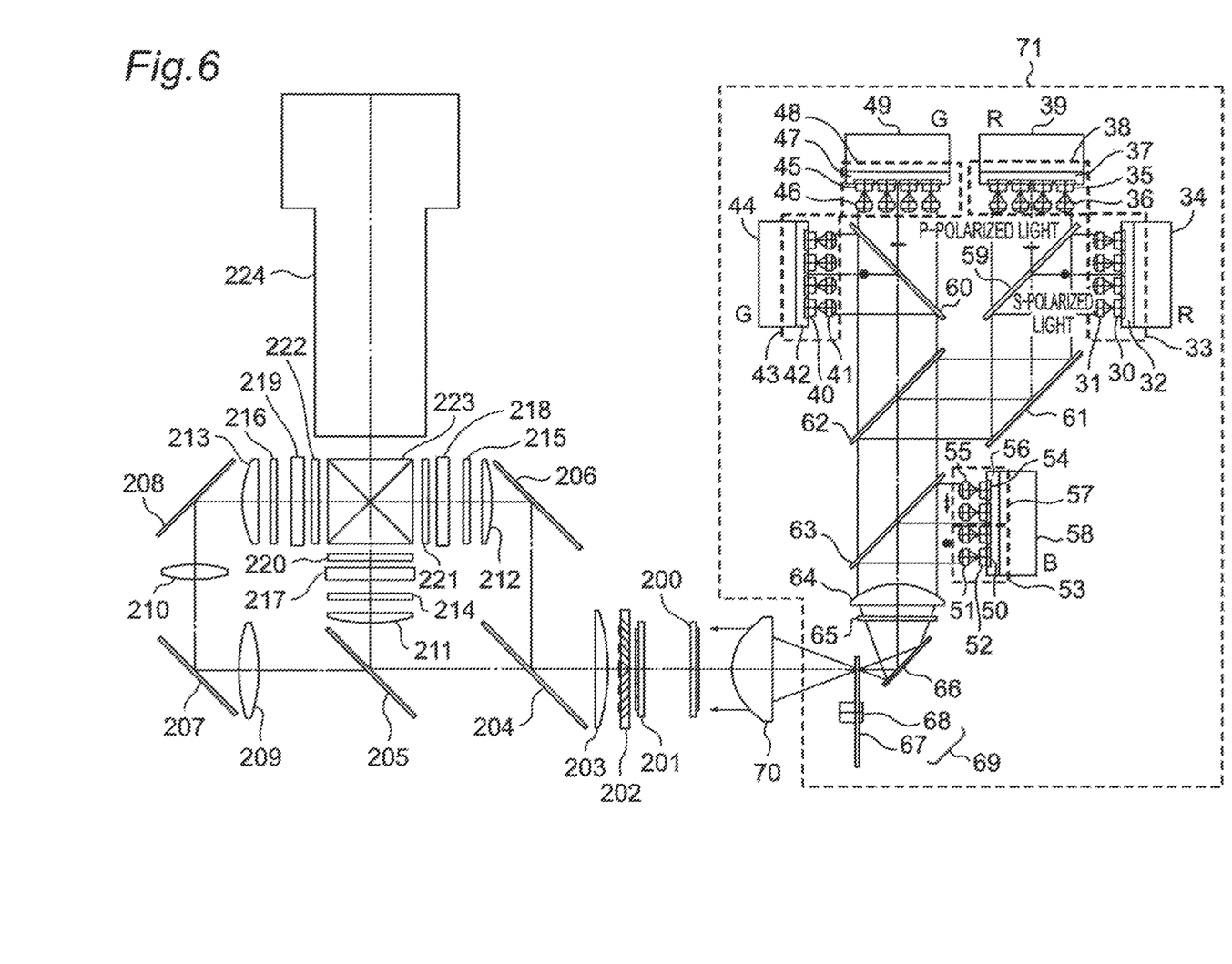
FIG. 6 is a block diagram illustrating a configuration example of a projection-type three-dimensional display apparatus according to a fourth embodiment of the present invention.

FIG. 6 is a block diagram illustrating a configuration example of a projection-type three-dimensional display apparatus according to a fourth embodiment. The projection-type three-dimensional display apparatus according to the fourth embodiment has the following features.

(1) Active-matrix transmission-type liquid crystal panels 217, 218, and 219, which are in a TN mode or a VA mode and have thin-film transistors formed in a pixel region are used as image forming means.

(2) The light source apparatus 71 of FIG. 1 is used.

In the projection-type three-dimensional display apparatus of FIG. 6, a projection unit subsequent to the condenser lens 70 includes a first lens array plate 200, a second lens array plate 201, a polarization conversion element 202, a superimposition lens 203, a blue-reflecting dichroic mirror 204, a green-reflecting dichroic mirror 205, reflection mirrors 206, 207, and 208, relay lenses 209 and 210, field lenses 211, 212, and 213, incidence-side polarization plates 214, 215, and 216, liquid crystal panels 217, 218, and 219, emission-side polarization plates 220, 221, and 222, a color combination prism 223 including a red-reflecting dichroic mirror and a blue-reflecting dichroic mirror, and a projection lens 224.

Referring to FIG. 6, the light rays from the light source apparatus 71 are incident on the first lens array plate 200 including a plurality of lens elements through the condenser lens 70. The rays incident on the first lens array plate 200 are divided into a plurality of rays. The plurality of divided rays converges on the second lens array plate 201 including a plurality of lenses. The lens elements of the first lens array plate 200 have opening shapes similar to the shapes of the liquid crystal panels 217, 218, and 219. Focal lengths of the lens elements of the second lens array plate 201 are determined such that the first lens array plate 200 and the liquid crystal panels 217, 218, and 219 have substantially a conjugation relation. The light rays divided from the second lens array plate 201 are incident on the polarization conversion element 202. The polarization conversion element 202 includes a polarization separating prism and a half-wavelength plate, and converts the P-polarized light and S-polarized light from the light sources into light rays having one polarization direction.

The light emitted from the polarization conversion element 202 is incident on the superimposition lens 203. The superimposition lens 203 is provided in order to superimpose the light emitted from the lens elements of the second lens array plate 201 on the liquid crystal panels 217, 218, and 219. The first lens array plate 200, the second lens array plate 201, and the superimposition lens 203 are used as an illumination optical system. The light rays from the superimposition lens 203 are separated into blue, green, and red light rays by the blue-reflecting dichroic mirror 204 and the green-reflecting dichroic mirror 205, which are color separating means. The green light rays are transmitted through the field lens 211 and the incidence-side polarization plate 214, and are incident on the liquid crystal panel 217. The blue light rays are reflected from the reflection mirror 206, are transmitted through the field lens 212 and the incidence-side polarization plate 215, and are incident on the liquid crystal panel 218. The red light rays are transmitted through, refracted from, and reflected from the relay lenses 209 and 210 and the reflection mirrors 207 and 208, are transmitted through the field lens 213 and the incident-side polarization plate 216, and are incident on the liquid crystal panel 219.

The three liquid crystal panels 217, 218, and 219 form a green, blue, and red image by changing polarization states of the light rays to be incident by controlling a voltage applied to pixels according to the video signal for the right eye and the video signal for the left-eye of the time-division three-dimensional display and modulating the light rays through a combination of the incidence-side polarization plates 214, 215, and 216 and the emission-side polarization plates 220, 221, and 222, which are arranged on both sides of the liquid crystal panels 217, 218, and 219 such that transmission axes are perpendicular to each other. The intensities of the red, green, and blue laser beams having two wavelength bands are modulated such that the light on the short wavelength side and the light on the long wavelength side correspond to the video signal for the right eye and the video signal for the left eye of the three-dimensional display, respectively. Since the laser light sources can be driven at a high speed, the laser light source can be driven according to the video signals for the three-dimensional display.

The respective color light rays transmitted through the emission-side polarization plates 220, 221, and 222 are incident on the color combination prism 223. The red and blue light rays are reflected from the red-reflecting dichroic mirror and the blue-reflecting dichroic mirror, respectively, and are combined with the green light rays in the color combination prism, and a combined light rays are incident on the projection lens 224. The light rays incident on the projection lens 224 are enlarged and projected on a screen (not illustrated). A three-dimensional image can be viewed through glasses that transmit only the light for the right eye of the image light rays for the right eye and the left eye enlarged and projected on the screen or only the light for the left eye.

The light source apparatus 71 (FIG. 1) of FIG. 6 has a small size, and emits high-efficiency white light by using the red, green, and blue laser light sources having the multiple wavelength bands. Thus, it is possible to realize a projection-type three-dimensional display apparatus with a small size and wide color gamut compared to the prior art. In addition, since the three liquid crystal panels 217, 218, and 219 that use not the time division method but polarization are used as the image forming means, it is possible to obtain a bright high-definition projection image with favorable color reproduction compared to the prior art while having no color-breaking noise. In addition, since it is not necessary to provide the total reflection prism and the color combination prism 223 is a small prism having an incidence angle of 45 degrees, the projection-type three-dimensional display apparatus with the small size can be achieved compared to the case where the three DMDs 171, 172, and 173 are used.

As stated above, in accordance with the projection-type three-dimensional display apparatus according to the fourth embodiment, the light source apparatus 71 includes the red, green, and blue laser light sources, the dichroic mirrors that combine the light rays of the laser light sources, and the rotary diffusion plate. Among the laser beams having the multiple wavelength bands, the light on the short wavelength side is the P-polarized light and the light on the long wavelength side is the S-polarized light. The P-polarized light and the S-polarized light are perpendicular to each other. Thus, the projection-type three-dimensional display apparatus a small size and high efficiency can be achieved compared to the prior art.

Fifth Embodiment

Figure 7:
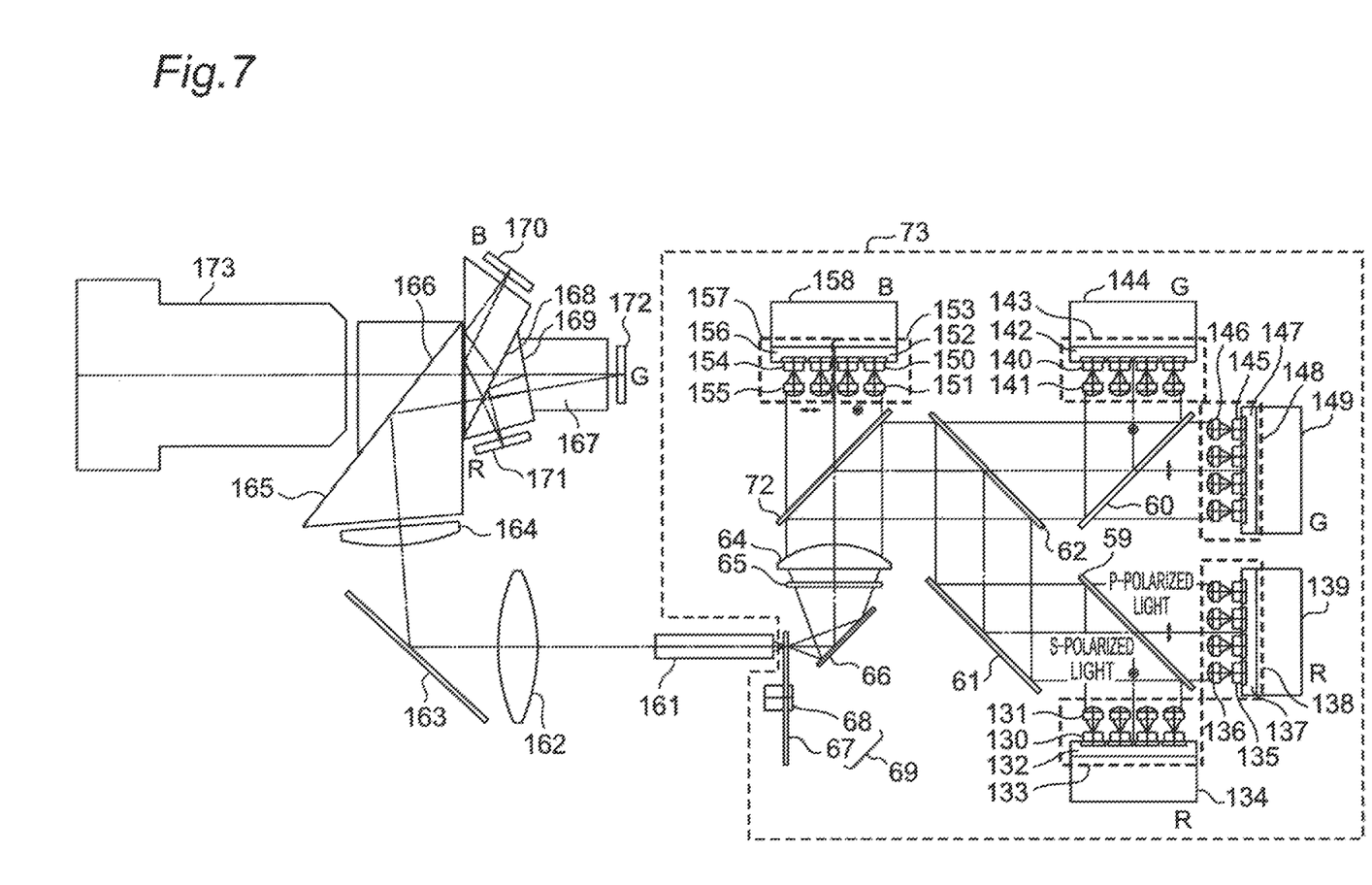
FIG. 7 is a block diagram illustrating a configuration example of a projection-type three-dimensional display apparatus according to a fifth embodiment of the present invention.

FIG. 7 is a block diagram illustrating a configuration example of a projection-type three-dimensional display apparatus according to a fifth embodiment of the present invention. The projection-type three-dimensional display apparatus according to the fifth embodiment is characterized in that the light source apparatus 73 of FIG. 3 is provided instead of the light source apparatus 71 in the projection-type three-dimensional display apparatus of FIG. 5. Accordingly, the projection-type three-dimensional display apparatus can have the actions and effects according to the second embodiment of FIG. 3, and the projection-type three-dimensional display apparatus with the small size and high efficiency can be achieved compared to the prior art.

Sixth Embodiment

Figure 8:
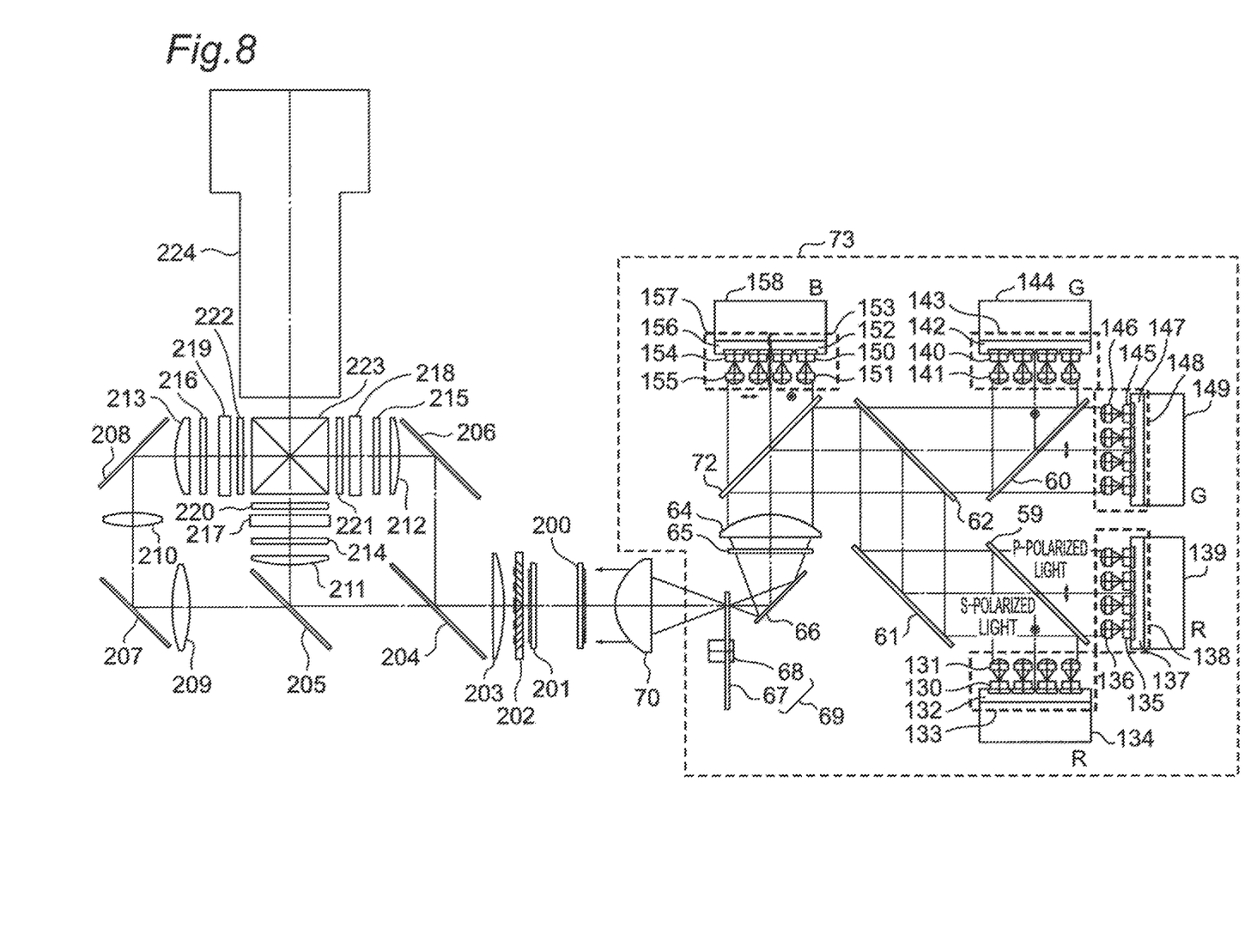
FIG. 8 is a block diagram illustrating a configuration example of a projection-type three-dimensional display apparatus according to a sixth embodiment of the present invention.

FIG. 8 is a block diagram illustrating a configuration example of a projection-type three-dimensional display apparatus according to a sixth embodiment of the present invention. The projection-type three-dimensional display apparatus according to the sixth embodiment is characterized in that the light source apparatus 73 of FIG. 3 is provided instead of the light source apparatus 71 in the projection-type three-dimensional display apparatus of FIG. 6. Accordingly, the projection-type three-dimensional display apparatus can have the actions and effects according to the second embodiment of FIG. 3, and the projection-type three-dimensional display apparatus with the small size and high efficiency can be achieved compared to the prior art.

Other Embodiments

As stated above, the embodiments have been described as examples of the technology disclosed in the present application. However, the technology according to the present disclosure is not limited thereto, and can be applied to embodiments obtained by appropriately changing, replacing, adding, and omitting. In addition, new embodiments can be derived by combining the components described in the aforementioned embodiments.

Hereinafter, other embodiments will be described.

Although it is described in the aforementioned embodiments that the transmission-type liquid crystal panels are used as the image forming means, reflection-type liquid crystal panels may be used. The projection-type three-dimensional display apparatus with a smaller size can be achieved by using the reflection-type liquid crystal panels.

As stated above, the embodiments are described as examples of the technology of the present disclosure. Thus, the accompanying drawings and detailed description have been provided.

Therefore, not only components which are essential for solving the problems but also components which are not essential for solving the problems in order to illustrate the aforementioned technology may be included in the components described in the accompanying drawings and detailed description. Thus, the fact that the non-essential components are described in the accompanying drawings and detailed description should not directly prove that the non-essential components are essential.

In addition, since the aforementioned embodiments are provided in order to illustrate the technology of the present disclosure, various changes, replacements, additions, and omissions can be performed within the scope of the claims or the equivalents thereof.

INDUSTRIAL APPLICABILITY

As described above, in accordance with the present disclosure, the laser light sources that emit the multiple wavelength bands, the dichroic mirrors that combine the light rays from the laser light sources, and the dynamic diffusion plate. Since the laser beams having the multiple wavelength bands are the polarized light rays perpendicular to each other on the short wavelength side and the long wavelength side, the light source apparatus with wide color gamut, small size, and high efficiency can be achieved. Thus, it is possible to realize a projection-type three-dimensional display apparatus with wide color gamut, small size, and high efficiency.

What is claimed is:

1. A light source apparatus comprising:
a plurality of laser light sources configured to emit color light rays having multiple wavelength bands;
a plurality of dichroic mirrors configured to combine the color light rays and output combined color light rays; and
a dynamic diffusion plate configured to diffuse incident light rays from the plurality of dichroic mirrors so as to remove speckles specific to laser beams,
wherein one of the plurality of dichroic mirrors at a final stage of the plurality of dichromic mirrors is configured to reflect blue light, and
wherein the plurality of laser light sources includes:
a first blue laser light source configured to generate a P-polarized short-wavelength-band laser beam;
a second blue laser light source configured to generate an S-polarized long-wavelength-band laser beam having a wavelength longer than a wavelength of the P-polarized short-wavelength-band laser beam of the first blue laser light source;
a first green laser light source configured to generate a P-polarized short-wavelength-band laser beam;
a second green laser light source configured to generate an S-polarized long-wavelength-band laser beam having a wavelength longer than a wavelength of the P-polarized short-wavelength-band laser beam of the first green laser light source;
a first red laser light source configured to generate a P-polarized short-wavelength-band laser beam; and
a second red laser light source configured to generate an S-polarized long-wavelength-band laser beam having a wavelength longer than a wavelength of the P-polarized short-wavelength-band laser beam of the first red laser light source.

2. A light source apparatus comprising:
a plurality of laser light sources configured to emit color light rays having multiple wavelength bands;
a plurality of dichroic mirrors configured to combine the color light rays and a output combined color light rays; and
a dynamic diffusion plate configured to diffuse incident light rays from the plurality of dichroic mirrors so as to remove speckles specific to laser beams,
wherein one of the plurality of dichroic mirrors at a final stage of the plurality of dichromic mirrors is configured to transmit blue light, and
wherein the plurality of laser light sources includes:
a first blue laser light source configured to generate an S-polarized short-wavelength-band laser beam;
a second blue laser light source configured to generate a P-polarized long-wavelength-band laser beam having a wavelength longer than a wavelength of the S-polarized short-wavelength-band laser beam of the first blue laser light source;
a first green laser light source configured to generate an S-polarized short-wavelength-band laser beam;
a second green laser light source configured to generate a P-polarized long-wavelength-band laser beam having a wavelength longer than a wavelength of the S-polarized short-wavelength-band laser beam of the first green laser light source;
a first red laser light source configured to generate an S-polarized short-wavelength-band laser beam; and
a second red laser light source configured to generate a P-polarized long-wavelength-band laser beam having a wavelength longer than a wavelength of the S-polarized short-wavelength-band laser beam of the first red laser light source.

3. The light source apparatus as claimed in claim 1, wherein each of the plurality of laser light sources is a semiconductor laser light source.

4. The light source apparatus as claimed in claim 1, wherein each of the plurality of laser light sources is configured to generate linear-polarized light rays.

5. The light source apparatus as claimed in claim 1, wherein the diffusion plate is a rotary diffusion plate, that includes a circular diffusion plate defined with uneven shapes on a surface of a glass substrate in a circumferential shape, and
a motor configured to rotate the circular diffusion plate.

6. A projection three-dimensional display apparatus comprising:
a light source apparatus;
an illumination optical system configured to concentrate light rays from the light source apparatus, and illuminate an illuminated region by the light rays;
an image forming element configured to form an image in the illuminated region according to a video signal; and
a projection lens configured to enlarge and project the image formed by the image forming element,
wherein the light source apparatus comprises:
a plurality of laser light sources configured to emit color light rays having multiple wavelength bands;
a plurality of dichroic mirrors configured to combine the color light rays and output combined color light rays; and
a dynamic diffusion plate configured to diffuse incident light rays from the plurality of dichroic mirrors so as to remove speckles specific to laser beams,
wherein one of the plurality of dichroic mirrors at a final stage of the plurality of dichroic mirrors is configured to reflect blue light, and
wherein the plurality of laser light sources includes:
a first blue laser light source configured to generate a P-polarized short-wavelength-band laser beam;
a second blue laser light source configured to generate an S-polarized long-wavelength-band laser beam having a wavelength longer than a wavelength of the P-polarized short-wavelength-band laser beam of the first blue laser light source;
a first green laser light source configured to generate a P-polarized short-wavelength-band laser beam;
a second green laser light source configured to generate an S-polarized long-wavelength-band laser beam having a wavelength longer than a wavelength of the P-polarized short-wavelength-band laser beam of the first green laser light source;
a first red laser light source configured to generate a P-polarized short-wavelength-band laser beam; and
a second red laser light source configured to generate an S-polarized long-wavelength-band laser beam having a wavelength longer than a wavelength of the P-polarized short-wavelength-band laser beam of the first red laser light source.

7. The projection three-dimensional display apparatus as claimed in claim 6,
wherein the image forming element is a liquid crystal panel.

8. The projection three-dimensional display apparatus as claimed in claim 6,
wherein the image forming element is a mirror-deflection digital micro-mirror device.

9. A projection three-dimensional display apparatus comprising:
a light source apparatus;
an illumination optical system configured to concentrate light rays from the light source apparatus, and illuminate an illuminated region by the light rays;
an image forming element configured to form an image in the illuminated region according to a video signal; and
a projection lens configured to enlarge and project the image formed by the image forming element,
wherein the light source apparatus comprises:
a plurality of laser light sources configured to emit color light rays having multiple wavelength bands;
a plurality of dichroic mirrors configured to combine the color light rays and output combined color light rays; and
a dynamic diffusion plate configured to diffuse incident light rays from the plurality of dichroic mirrors so as to remove speckles specific to laser beams,
wherein one of the plurality of dichroic mirrors at a final stage of the plurality of dichroic mirrors is configured to transmit blue light, and
wherein the plurality of laser light sources includes:
a first blue laser light source configured to generate an S-polarized short-wavelength-band laser beam;
a second blue laser light source configured to generate a P-polarized long-wavelength-band laser beam having a wavelength longer than a wavelength of the S-polarized short-wavelength-band laser beam of the first blue laser light source;
a first green laser light source configured to generate an S-polarized short-wavelength-band laser beam;
a second green laser light source configured to generate a P-polarized long-wavelength-band laser beam having a wavelength longer than a wavelength of the S-polarized short-wavelength-band laser beam of the first green laser light source;
a first red laser light source configured to generate an S-polarized short-wavelength-band laser beam; and
a second red laser light source configured to generate a P-polarized long-wavelength-band laser beam having a wavelength longer than a wavelength of the S-polarized short-wavelength-band laser beam of the first red laser light source.

10. The projection three-dimensional display apparatus as claimed in claim 9,
wherein the image forming element is a liquid crystal panel.

11. The projection three-dimensional display apparatus as claimed in claim 9, wherein the image forming element is a mirror-deflection digital micro-mirror device.

\* \* \* \* \*